United States Patent [19]

Hawkes et al.

[11] 4,092,059
[45] May 30, 1978

[54] COUPLER FOR OPTICAL COMMUNICATION SYSTEM

[75] Inventors: Thaddeus Hawkes; Jean-Claude Reymond, both of Paris, France

[73] Assignee: Thomson-CSF, Paris, France

[21] Appl. No.: 740,193

[22] Filed: Nov. 9, 1976

[30] Foreign Application Priority Data

Nov. 14, 1975  France ................... 75 34889

[51] Int. Cl.² ............................................. G02B 5/16
[52] U.S. Cl. .............................. 350/96.16; 350/96.24
[58] Field of Search ....................... 350/96 C, 96 B

[56] References Cited

U.S. PATENT DOCUMENTS 3,936,141  2/1976  Milton ............................ 350/96 C

OTHER PUBLICATIONS

"The Star Coupler: A Unique Interconnection Component for Multimode Optical Waveguide Communications Systems" by Hudson et al. in Appl. Optics vol. 13, No. 11, Nov. 74, pp. 2540–2545.

*Primary Examiner*—John K. Corbin
*Assistant Examiner*—Stewart Levy
*Attorney, Agent, or Firm*—Cushman, Darby & Cushman

[57] ABSTRACT

A reciprocal coupler for connecting anyone of a plurality of optical signal transmission lines to all the other transmission lines in an optical communication system.

The coupler comprises an elongated transparent optical mixing rod optically coupled by a first endface to each of the waveguides forming the lines to be interconnected and by its second endface to both ends of return guides provided by a fiber bundle which form a loop.

4 Claims, 9 Drawing Figures

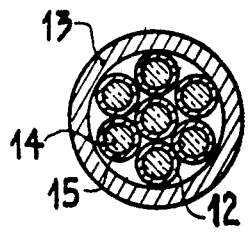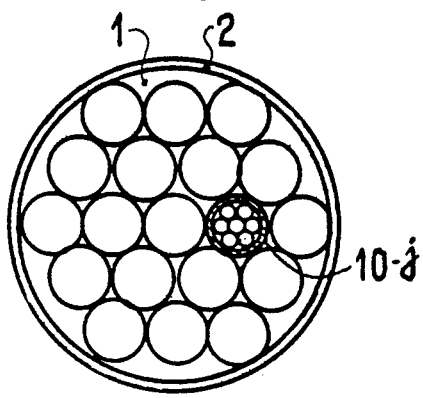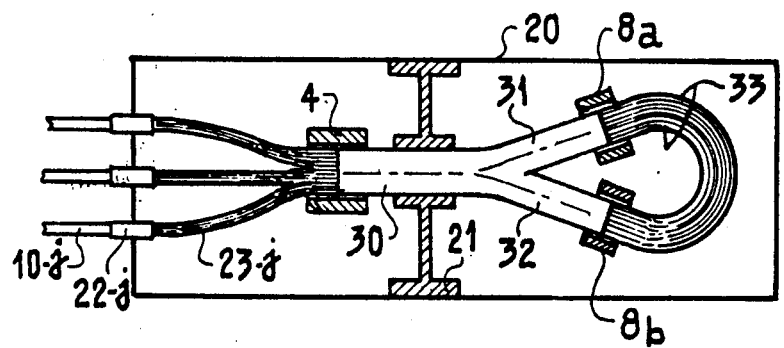

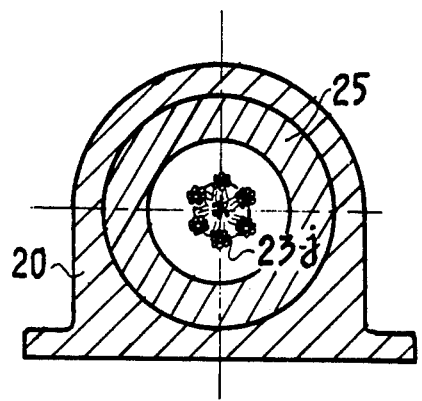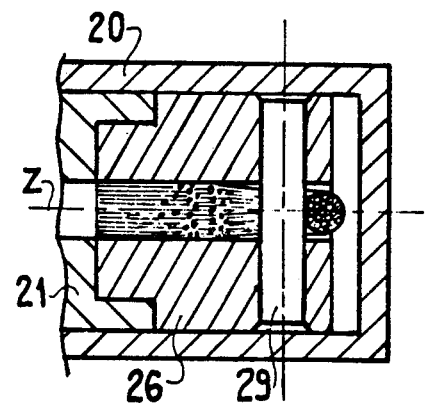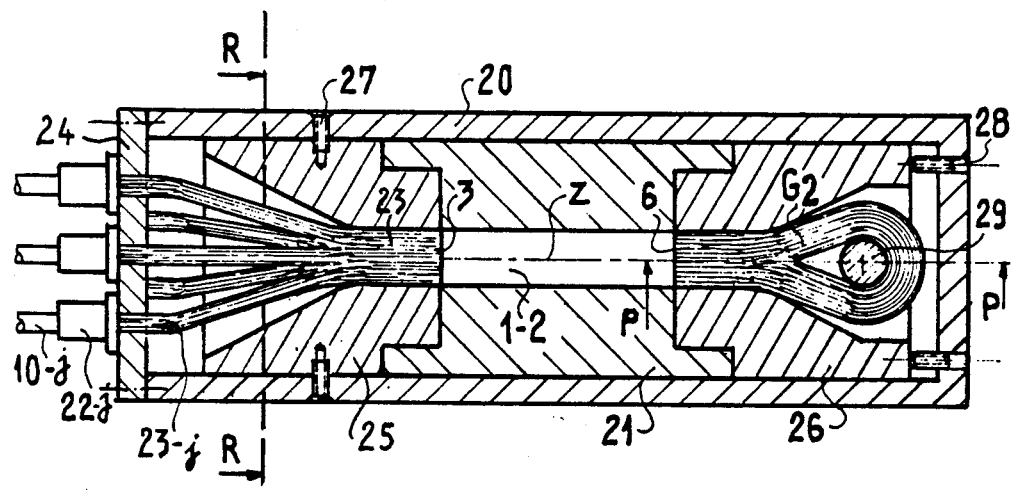

COUPLER FOR OPTICAL COMMUNICATION SYSTEM

The present invention relates to a coupler for connecting light guides in an optical communication system so that signal in the form of light waves may be transmitted from one transmission line to a plurality of other signal transmission lines of the system.

More precisely, the invention relates to the production of a reciprocal optical coupler which enables any one of a plurality of optical signal transmission lines to be connected to all other lines, the line so connected representing a transmission channel and the other lines reception channels in the corresponding optical communication system.

The transmission media utilized in the transmission of frequencies within the frequency spectrum of light are herein referred to as optical signal transmission lines or merely transmission lines which may consist of a single optical waveguide or a bundle thereof. Optical waveguides normally consist of an optical fiber having a transparent core surrounded by layer of transparent cladding material having a refractive index N2 which is lower than the refractive core index N1.

To establish optical communications between a plurality of points or stations, a variety of interconnection schemes may be utilized.

In an optical communication system utilizing optical waveguides to link different points, these points being provided with light-wave transmission devices and/or light-wave receiving devices, it is in fact often useful and necessary to connect one transmitting point to a plurality of receiving points. Such a configuration is represented, in particular, by a network having no central unit and in which a plurality of user points need to be interconnected. The term user points means the various stations to be connected, it being understood that each of these has either a transmitter or a receiver or both.

The various links envisaged between each transmitter and the receivers are provided either by using a very large number of light guides if point to point links are formed, or with the aid of optical couplers. The first solution results in a complex structure when the number of interconnected stations is large.

The second solution likewise results in a complex struture since a large number of optical waveguides and optical couplers may be needed when use is made of Y-couplers, remembering that these allow only a single division to be made of the light energy received by an input channel which divides generally into two output channels. In addition Y-couplers do not permit reciprocal operation.

Other types of optical couplers permit reciprocal operation. In one known embodiment, the coupler is formed by an elongated transparent bar, such as a cylindrical block of glass-fiber termed a mixer rod, which is connected by one plane endface to the various optical transmission lines and whose other plane endface is made reflective. The light energy coming from an optical signal transmission line is returned by the reflective endface to the surface represented by the junction face. By reflection from the mirror, the light energy from one line is transmitted to all the lines with a substantially uniform distribution, assuming that the dimensions of the mixer and the numerical aperture of the optical waveguides of the transmisssion lines meet predetermined conditions.

Such an optical coupler is described, in particular, in the magazine "Electronics" for Mar. 21, 1974, pages 34–36, in an article "Low-less coupler feeds 20 terminals". Its production requires a high precision machining of the plane mirror so that it lies perfectly perpendicular to the axis of the cylindrical block, so as to prevent the reflected light from being scattered and part of it being lost by the diaphragm effect, thus adding to the losses due to diffusion.

One object of the invention is to produce a reciprocal optical coupler device in which the above drawbacks are substantially removed.

In accordance with a feature of the invention, there is provided an optical coupler for connecting optical signal transmission lines in an optical communication system, such that a signal in anyone of said lines is transmitted to all other lines of the system, each of said lines comprising at least one optical waveguide, said coupler comprising:

an optical mixer comprising an elongated rod of transparent material with a side surface, first and second planar opposite endfaces, and means surrounding said rod for forming with said side surface a light reflecting interface;

first support means for grouping one end of said lines in a bundled parallel arrangement such that said waveguides constitutes a first group of waveguides which terminate in faces disposed in a plane adjacent and parallel to said mixer first endface;

a second group of optical waveguides;

second support means for grouping the waveguides of said second group together at both their ends in a bundled parallel arrangement and such that they terminate in faces disposed in a place adjacent and parallel to said second endface.

The invention will now be further described with reference to the accompanying drawings in which:

FIG. 4, is a cross-section through a bundle of optical fibers;

FIG. 5, shows a grouping of fiber bundles as in FIG. 4;

FIG. 6 to 8 shows sectional views of an embodiment of the optical coupler; and

FIG. 9 shows a cross-sectional view of another embodiment of the optical coupler.

Figure 1:
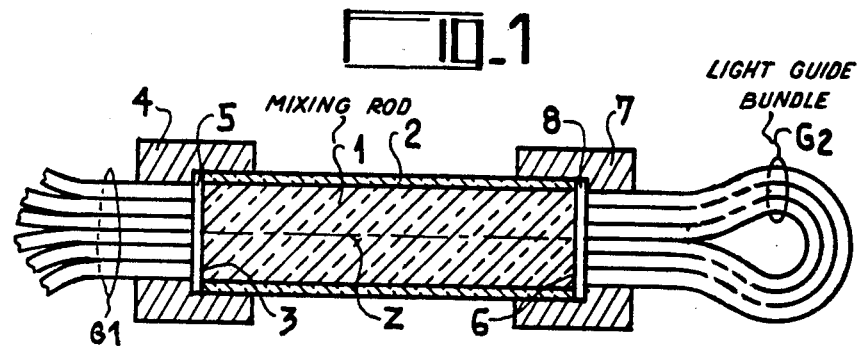
FIG. 1, is a cross-sectional view of an optical signal coupler constructed in accordance with the present invention.

With reference to FIG. 1 the optical coupler comprises a mixing rod provided by a single mixing fiber, which rod consists of a cylindrical central portion 1 forming the core and cladding material 2 surrounding the core.

The various optical waveguides which constitute the signal transmission lines to be interconnected form a first group G1 which is connected to a planar endface 3 of the mixer rod. Mechanical support means 4 provide the optical coupling to the endface 3 in such a way that the terminal parts of the waveguides are parallel to the propagation direction Z which is the axis of the cylinder 1, and in such a way that the endfaces of these terminal parts are grouped together in a single plane parallel to the endface 3. A medium 5 formed by air or a transparent material may be provided or, alternatively, the connection may take place by direct contact.

The second planar endface 6 of the mixer is optically connected to a second group G2 of optical waveguides of which the other endfaces cover substantially the remainder of this area, these waveguides G2, which form a loop, being each coupled at both ends to endface 6.

As for group G1, connecting and/or holding means 7 and 8 similar to members 4 and 5 are provided for the second group of guides G2.

Figure 2:
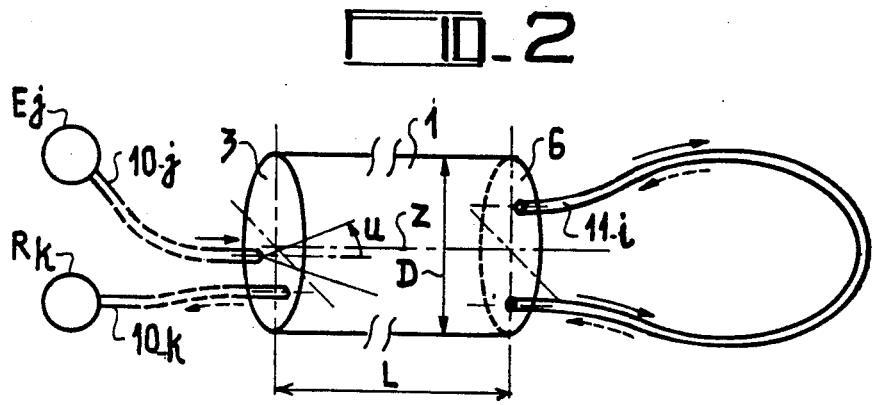
FIG. 2, is a diagram illustrating the operation of the coupler of FIG. 1.

Endface 3 forms an entry/exit face and endface 6 a return face, as will become apparent from the explanation of the operation with reference to FIG. 2. Light from a transmitting device Ej arrives at face 3 along a linking waveguide 10j belonging to group G1 and passes through this face 3 and enters the core 1 of the mixer. The axial length L of the mixer rod is made at least equal to $D/\tan u$, $D$ being the diameter of the cylinder 1 and $u$ being the acceptance angle corresponding to the numerical aperture of the guide, to perform the mixing function. Under these conditions, the light from a waveguide 10j is distributed over the return surface 6 in a uniform, or substantially uniform, manner. The end of each waveguide 11i in group G2 thus receives a fraction of that light and transmits it to the other end of the guide so that it can be retransmitted into the optical mixer 1-2 in the direction of face 3. As a result of reciprocity, the light energy fraction which is re-emitted by the endface of each of the waveguides such as 11i is uniformly distributed over the entry/exit face 3 and thus over the end faces of the various waveguides in group G1. Finally, the emitted light is equally distributed over all the waveguides 10 in group G1, such as the guide 10k shown which is considered connected at its other end to a receiver device Rk.

Figure 3:
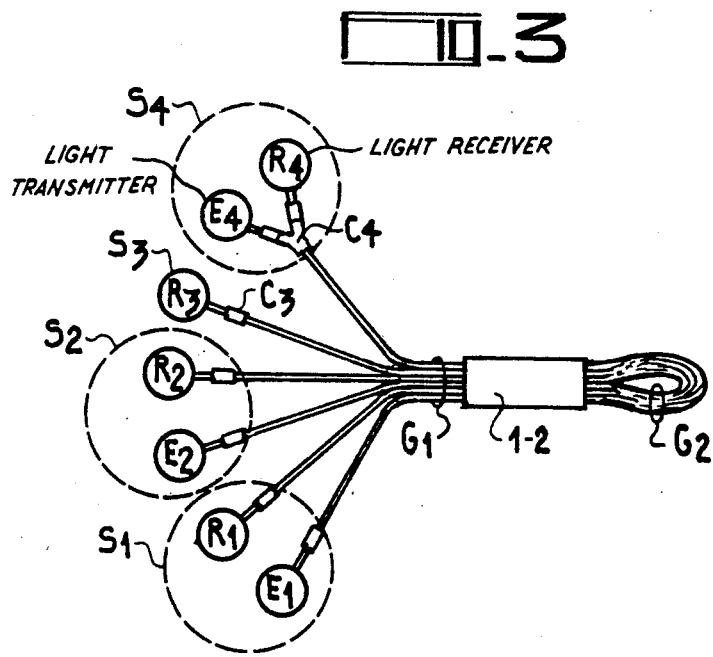
FIG. 3, shows an optical transmission system comprising an optical coupler as in FIG. 1.

It is thus clearly apparent that each waveguide in group G1 is coupled in the same way to the other waveguides in the group and that in this way each transmitter in a network may be connected to all the receivers in the network. FIG. 3 shows, by way of example, an optical communication system of this kind in which certain of the terminal stations S1 to S4 (such as S1, S2 and S4) may contain both an emitter and receiver and certain stations (such as S3) may contain only a receiver. The links to the coupler may be formed by one rather than two connecting guides as shown by using an intermediate Y optical coupler C4. The waveguides are connected to the emitters and receivers by suitable optical waveguide connectors such as C3.

Referring back to FIG. 2, it should be pointed out that the endfaces of each return waveguide 11i may occupy any position whatsoever on face 6 and their positions are not subject to any conditions such as, for example, being symmetrical about axis Z. Thus, the first endfaces of the waveguides in group G2 may be distributed in a random fashion over face 6 and the second endfaces may occupy the remaining positions, that is to say may be distributed in a similarly random fashion. If it is assumed that the distribution of the light energy arriving at face 6 is not completely uniform, this deficiency is certain to have been made good by the time the light reaches face 3 as a result of the aforesaid random distribution of the waveguides over face 6. A distribution of this type can be fairly easily achieved with waveguides 11, each of which is formed by a bundle of fibers 12 (FIG. 4) of which the terminal part is stripped of its protective sheath 13, by mingling together the fibers forming the various bundles. Each optical fiber 12 has a transparent core 14 and a layer of transparent cladding material 15. The protective sheath 13 of the bundle is generally opaque and made of plastics material.

The fiber-bundle structure in FIG. 4 is also applied to the various waveguides in group G1, which may be grouped together at circular face 3 in the manner shown by way of illustration in FIG. 5. For reasons of simplicity and clarity only one waveguide 10j is shown in detail and is not hatched.

To achieve good efficiency, it is necessary that the endfaces of the return fiber 11 should fill the return area 6 as densely as possible. It is therefore preferable to use optical fiber of small diameter, group G2 thus consisting of a large number of optical fiber. The choice of a small diameter must be weighed against the inherent efficiency of the fibers, which may vary with diameter. Given that the useful area of each fibre endface is that represented by the core area, it is necessary to reduce as far as possible the non-useful area occupied by the core cladding. This means that it is preferable to use fiber in which the thickness of the core-cladding is small in comparison with the diameter of the core, or alternatively to reduce the thickness of that cladding at the extremities of the return fiber by any suitable process or treatment. The above remarks also apply to the group of guides G1 which come to the entry/exit face 3. Finally, to ensure that the return loop is compact, the fibres 11 are preferably of a type which have a larger numerical aperture and thus permit small radii of curvature. The type of fiber is also subject to high losses but bearing in mind the very short length of the optical return path this latter factor does not affect their choice.

FIGS. 6 to 8 show a possible embodiment of the optical coupler. FIG. 6 shows a longitudinal section, the mixing fiber 1, 2 is contained in a housing 20 and is held in postion by a supporting element 21. Each waveguide 10j in group G1 is coupled through an optical connector 22j to a fiber or a fiber bundle 23j. The connectors 22 are disposed on a cover 24. A mechanical piece 25 enables the fiber bundles 23j to be combined into a single cylindrical bundle 23 which is coupled to the entry/exit face 3 of the mixing rod 1-2. In the same way, a mechanical piece 26 combines the fibers in the loop G2 into a single cylindrical bundle at the return face 6. Attachment members such as screws 27 and 28 are provided to attach the components and hold them in position. The return loop G2 is looped around a mechanical rod 29. FIG. 7 is a cross section on RR and FIG. 8 a partial longitudinal section on PP perpendicular to the plane of FIG. 6.

The set of guides G2 can easitly be made to have a properly plane face by polishing the fiber after they have been grouped together into a single cylindrical bundle. The face at which they are grouped together is then coupled optically to plane face 6 either by a transparent interface 8 (FIG. 1), which is formed by a gas such as air, or a liquid, or a solid substance such as glass or a plastics material of suitable refractive index, or else by direct mechanical contact.

It is understood that the mixer may be of a form other than a piece of large diameter optical fiber. An equivalent would be a glass rod of which the lateral wall had been covered with a reflective deposit or, alternatively, a hollow internally polished cylinder whose inside wall had been rendered reflective.

Following the same concept, FIG. 9 shows a modified embodiment in which the mixing rod is formed by the input arm 30 of a three arm optical coupler or "Y" coupler. In such a coupler the incident light energy is shared between the output arms 31 and 32. If, on the other hand, light is transmitted in the opposite direction from an output arm, the whole of the energy transmitted from this output arm goes to the end of the input arm 30. The output arms 31–32 are coupled together optically by a bundle of fibers 33 to form a return loop corresponding to group G2 in FIG. 1.

The optical coupler described may advantageously be applied to interconnecting optical waveguides formed by bundles of fibers so as to provide optical transmission in multi-mode operation.

Of course the invention is not limited to the embodiment described and shown which was given solely by way of example.

What is claimed is:

1. A coupler for connecting optical signal transmission lines in an optical communication system, such that a signal in any one of said lines is transmitted to all other lines of the system, each of said lines comprising at least one optical waveguide, said coupler comprising:
    an optical mixer comprising an elongated rod of transparent material having first and second planar opposite endfaces and means surrounding said rod for forming with the peripheral surface of said rod comprised between said endfaces a light reflecting interface;
    first support means for grouping one end of each of said lines which constitutes a first group of waveguides in a bundled parallel arrangement having endfaces disposed substantially in the plane of said mixer first endface;
    a second group of optical waveguides; and
    second support means for grouping the two ends of each waveguide of said second group together in a bundled parallel arrangement having endfaces disposed substantially in the plane of said mixer second endface.

2. A coupler according to claim 1, wherein said second group of waveguides is constituted by optical fibers, the ends of which being combined by said second support means to form a single fiber bundle having endfaces randomly distributed over a planar area corresponding to that of the said mixer second endface.

3. A coupler according to claim 2, wherein said first support means comprises optical connectors to connect each of said end transmission lines to at least one optical fiber, a first mechanical piece to group together the said fibers, which form said first group of waveguides downstream of the said connectors, into a single fiber bundle which terminates at the said mixer first endface, said second support means comprising a second mechanical piece to group together the optical fibers in the said second group into a single fiber bundle which terminates at the said mixer second endface.

4. A coupler for connecting optical signal transmission lines in an optical communication system, such that a signal in any one of said lines is transmitted to all other lines of the system, each of said lines comprising at least one optical waveguide, said coupler comprising: at least one optical waveguide, said coupler comprising:
    an optical mixer of the three-armed type having an input arm and two output arms with planar endfaces;
    first support means for grouping one end of each of said lines which constitutes a first group of waveguides in a bundled parallel arrangement having endfaces disposed substantially in the plane of said mixer first endface of said input arm;
    a second group of optical waveguides;
    second support means for grouping one end of each of the waveguides of said second group in a bundle parallel arrangement having endfaces disposed substantially in the plane of the mixer endface of a first of said output arms; and
    third support means for grouping the other end of each of the waveguides of said second group in a bundled parallel arrangement having endfaces disposed substantially in the plane of the mixer endface of the second of said output arms.

* * * * *